Aug. 18, 1936.   A. H. OELKERS   2,051,647
TRUCK
Filed July 24, 1930   5 Sheets-Sheet 2

Inventor:
Alfred H. Oelkers,
By Wilkinson, Huxley, Byron & Knight
Attys

Patented Aug. 18, 1936

2,051,647

UNITED STATES PATENT OFFICE 2,051,647

TRUCK

Alfred H. Oelkers, Chicago, Ill., assignor to American Steel Foundries, Chicago, Ill., a corporation of New Jersey Application July 24, 1930, Serial No. 470,318

97 Claims. (Cl. 105—197.1)

This invention pertains to truck construction, and more particularly to four-wheel trucks having a flexible side frame construction.

It is an object of this invention to provide a side frame including rigid and resilient side frame members.

Another object of the invention is to provide a truck construction wherein certain of the members are loaded to increase the amount of energy they will absorb.

A still further object of the invention is to provide a truck construction which will permit high-speed operation over roadways over which it is not safe to operate existing freight equipment at high speeds.

Still another object of the invention is to provide a truck which will permit oscillation of the car body transversely without tendency to force the wheel over the rail, and which does not permit the springs to go solid under the usual bouncing action when a fully loaded car is carried on the truck.

A yet further object is to provide a truck which eliminates wear due to the vertical movement of rubbing parts when under lateral thrust, and one which fulfills all requirements of manufacture and service.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

It will of course be appreciated that while only one side of the structure is shown and described, the other side thereof is substantially a duplicate of the side described.

Referring first of all more particularly to the embodiment of the invention illustrated in Figures 1 to 5 inclusive, the embodiment contemplates the use of the spaced anti-friction wheel and axle assemblies 20 of the ASF type, though any other form may be used. The assemblies include an outer casing or normally rotatable axle 22 provided with the lubricant recess 24 and the enlarged wheel hub 26 upon which is mounted the wheel 28, said wheel being preferably of the character as shown in application Serial No. 460,364, filed June 11, 1930. The lubricant recess is closed by means of the cover plate 29 secured as by means of the bolts 30 to the outer axle, said cover plate being disposed between the outer axle and the shrink collar 32 disposed on the inner normally non-rotatable axle 34. Anti-friction bearings 36 are disposed in said lubricant recess between said inner and outer axle, and are disposed according to and of the character of the ASF type of bearing assembly.

In the embodiment of the device illustrated it is contemplated that essentially the side frames comprise rigid and resilient members, as will be more particularly described. The inner axles 34 are provided with the bearings 38 between which and the ends of the rigid frame member 40 the axle bearers 42 are disposed. The frame member 40 is substantially U-shaped in side elevation, and includes the elongated central portion 44 provided with the upwardly extending end portions 46 terminating in axle bearer cooperating portions 48 which are preferably of closed configuration as a section of a journal box. In case it is contemplated that the usual standard type of friction bearing wheel and axle assembly is to be used, both ends of the truck side frame may be provided with the usual standard journal boxes for the friction bearings.

The upper ends of the frame, preferably directly over the axle, are provided with a cast integral spring pocket 50 substantially U-shaped in section and provided with the upwardly extending lugs 52 adapted to receive guard means in the form of bolts 54 forming retaining means for the spring assemblies 56 which may be said to form a part of the truck side frames. These leaf spring assemblies 56 are essentially a part of the side frame because they perform several of the functions usually performed by the side frame in that they maintain the truck square and prevent a skewing action which would otherwise occur between the wheel and axle assemblies and the lower rigid side frame members 40. In this construction, moreover, these spring assemblies 56 are required to receive from the main frame or transom, all side thrusts and end thrusts and to transmit these loads to the wheel and axle assemblies. Portions of these loads are transmitted directly through the leaf spring assemblies at their ends and the remainder is transmitted indirectly through the coil spring assemblies 100 and the rigid side frame member 40. This is a new principle in side frame construction because heretofore these side and end thrusts have been taken between cooperating parts on rigid members of trucks as, for example, between the column guides of the standard side frame and cooperating lugs or shoulders on a bolster. The importance of this principle may readily be seen because in such a construction no undampened shocks can be transmitted from the car body to the rail, nor from the rail to the car body. All such shocks must pass through the resilient spring assembly 56 and cannot pass directly from one rigid part to another rigid part. The spring pockets are arranged so that the weight on the spring plates is carried directly over the axle end, and the lower leaf spring is preferably provided with the depending wear portion 57 cooperating with the spring seats. It will be noticed that in initial or normal suspension, clearance is provided between the ends of the leaf springs and the end wall 58 of the spring pocket in order to permit relative movement of translation between the springs and the side frame upon deflection of said springs.

The car body is carried on the swinging bolster 60 which is preferably of the cast integral construction provided with the center plate 62, the upper sloping compression member 64 provided with the side bearing 66, and the lower upwardly sloping tension member 68, the end of said tension member being downwardly curved as at 70 and provided with the pocket 72 having cooperative relation with the bolster swing hanger 74. The bolster is provided with the spaced central brace member 75 disposed to extend in the direction of the length of said bolster and adjacent the rim of the center bearing in that direction. At the ends the tension and compression members are joined by the webs 77 which extend downwardly from adjacent the center of the side bearings to the tension member removed from the curved portion 70 thereof at the inboard side of said webs. The outer edge of said webs extends from adjacent the outer edge of the tension member downwardly to the outer rim of the pocket 72, the inner rim being reinforced by the bracket 79 which merges into the compression member.

Figure 3:
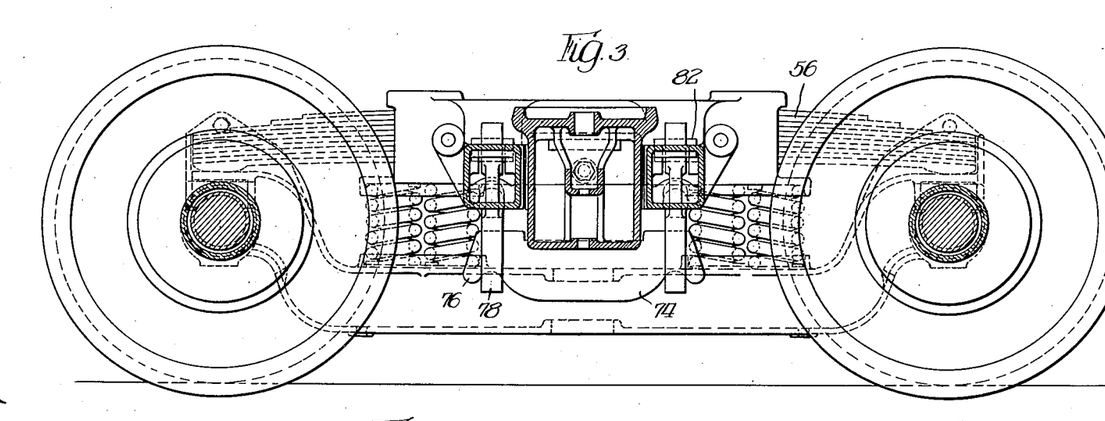
Figure 3 is a sectional side elevation taken substantially at the center line of the truck assembly shown in Figure 1.
Figure 4:
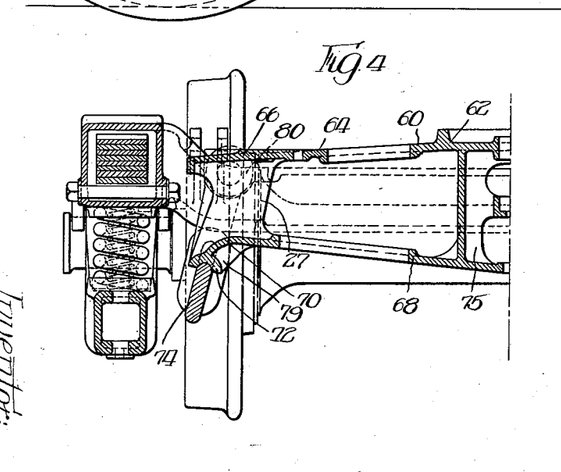
Figure 4 is a fragmentary sectional elevation taken substantially in the plane as indicated by the line 4—4 of Figure 2.
Figure 5:
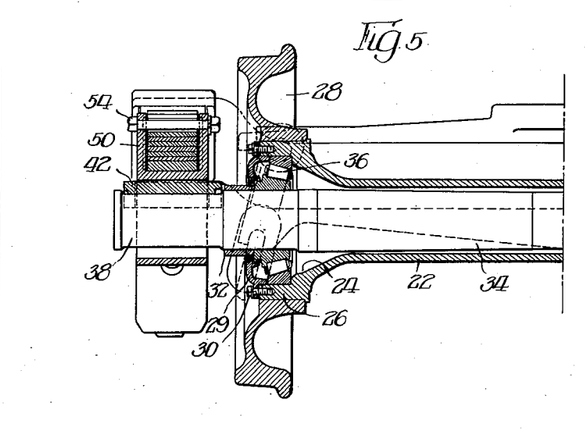
Figure 5 is a fragmentary transverse sectional elevation taken through the wheel and axle assemblies of the device shown in Figure 1.
Figure 6:
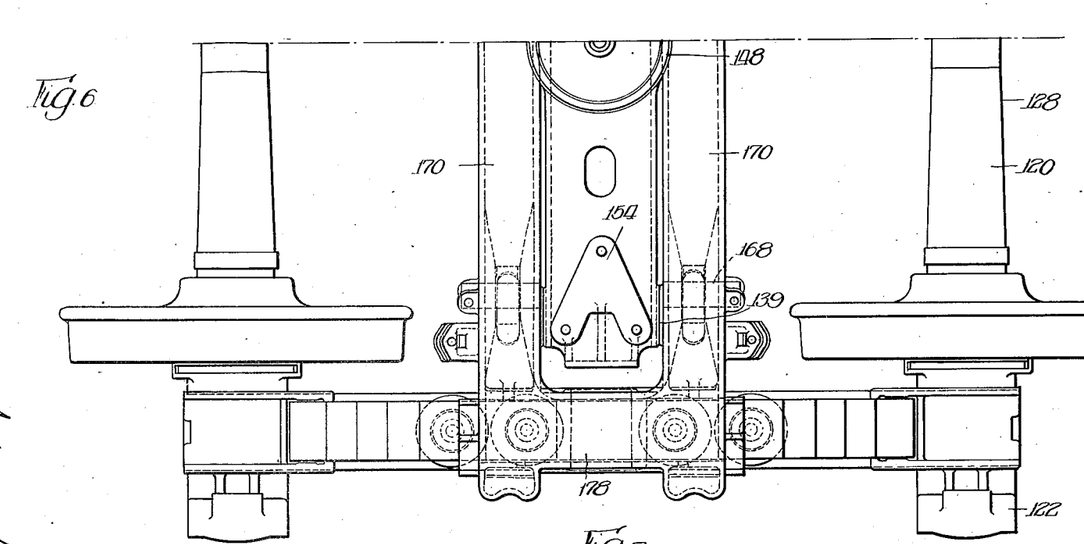
Figure 6 is a fragmentary top plan view of a modified form of truck frame assembly embodying the invention.
Figure 7:
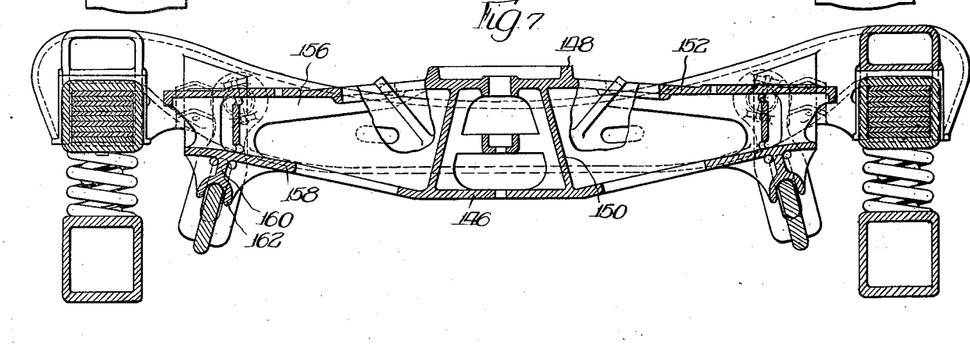
Figure 7 is a transverse sectional elevation taken substantially in the plane through the center line of the bolster shown in Figure 6.

The swing hanger is substantially U-shaped and provided with the end hook members 76 adapted to fit into slots in the bolster swing hanger links 78, said links extending upwardly and provided with the eye 80 adapted to receive the retaining pin 82 seated in the trunnions 84 provided on the spaced transversely extending members 86 of the transom or main frame, it being seen that the pins 82 extend partially within the contour of the transversely extending substantially rectangular members of the transom, as viewed in section in Figure 3. The transverse members 86 are joined together at their ends by longitudinally extending members 88 shaped to form a housing for receiving the spring assemblies 56, the housing being formed with end pockets 90 for cooperating with the spring bands 92 for positioning the spring assemblies. Each of the members 86 and the bolster are provided with the guiding or wear faces 87 disposed adjacent the ends of the bolster for maintaining the proper relative position between said members and transmitting longitudinal movements.

The main frame is provided with securing means in the form of the bolt 94 positioned slightly below the lower side of the spring plate assembly, the bolt acting to limit the downward deflection of the spring assembly between the spring bands, longitudinal shifting of the spring assemblies being prevented by means of the pockets disposed in the rigid frame member directly above the axles. Members 88 are provided with spaced spring seats 96 disposed directly above the spring seats 98 formed on the rigid frame member, said spring seats being adapted to receive coil spring assemblies 100 which include inner and outer spring members.

With this construction it will be noted that both vertical and lateral loads delivered from the car body to the trucks are imparted to the main frame by the swinging bolster, through the swing hanger links. This vertical loading on the main frame is carried partially by the coil springs and partially by the leaf springs. Due to the frictional characteristics of the leaf or elliptic springs in their action outwardly of the spring bands, each spring movement imparted to the coil springs is dampened, this dampening effect being further added to by the flexure of the leaf springs between the spring bands. The construction is so designed that lateral forces on the main frame may be imparted to the leaf spring bands 92 and through the leaf springs act against the side walls of the spring pockets 90. However, experience has proved that the adhesion of the parts where they rest upon one another, as at points 90 and at the ends of the leaf springs, is so great that the parts do not slip upon one another and the side and end thrusts are, therefore, transmitted from one part to the other without relative movement. The leaf spring assembly is proportioned, designed and assembled in relation to the coil springs so that when the coil springs go solid due to the vertical load the leaf springs will not be stretched above their elastic limit, and since the leaf springs act as guiding member to hold the main frame in lateral position, there are no rubbing and wearing surfaces on the truck side frame due to transmitting the lateral thrust from the bolster to the wheels. This is very important because excessive loading on the side frame on either one side or the other of the car body causes rolling which may cause derailment. When the lateral forces are transmitted from the bolster to the side frame by a rubbing surface, the load on the side frame may be frequently far in excess of the spring reaction because the frictional contact between the bolster and the side frame may momentarily transmit a large portion of the vertical shock, thereby adding this vertical force to the spring pressure. With this and the following types of trucks such objections are eliminated.

The construction shown in Figures 6 to 11 inclusive differs but slightly from that already described. In the latter construction the wheel and axle assemblies 120 (shown of the friction type) are adapted to be contained in the journal box 122, preferably cast integral with the substantially U-shaped rigid member 124 comprising part of the side frame. The spring receiving pocket 126 is at one side of the journal box and, as shown, not directly over the axle 128. The spring pocket is defined by side members 130 and vertical and bottom members 132 and 134, the vertical members being the journal box wall, the bottom members having cooperative engagement with wear portions 136 formed on the lower leaf spring of the spring assembly 138, said spring assembly forming the compression member of the side frame. In this case the spring assembly is provided with spring seat portions 140 substantially in alignment with spring seats 142 formed on the rigid lower or tension member of the side frame. Spring assemblies 144 are positioned between said spring seats, said spring assemblies preferably comprising inner and outer coiled springs.

The car body is supported on the bolster 146 which is of the cast integral type having the center bearing 148 reinforced by means of the vertical diagonal struts 150 preferably including pairs of spaced members merging into the upper compression member 152 of the bolster slightly removed from the periphery of the center bearing. The bolster is provided with suitable side bearings 154 reinforced by means of the diagonal brace members 156 extending downwardly and merging into the upwardly extending tension member 158. The hanger seat of the bolster comprises the web 160 merging into the tension member substantially normal thereto and at a point removed from the end, and the spaced arcuate hanger cooperating seat member 162. As before, the hanger 164 cooperates with the links 166 pivotally secured by means of the pins 168 to the spaced members 170 of the transom or main frame. The pins extend through apertures 172 disposed in the members 170, lock lugs 174 being provided on each side of said apertures for receiving suitable fastening means extending through apertures 176 disposed therein for locking the pin 168 in operative position. The spaced members 170 are joined by means of the member 178 which extends upwardly and is provided with vertically extending spaced members 180 defining a jaw which is adapted to fit over the leaf spring assembly 138, completing the assembly of the two sides of the truck. The spaced members and the bolster are provided with the bearing portions 139 adjacent the ends of the bolster for transmitting longitudinal stresses.

With this construction all the lateral forces are transmitted to the leaves of the springs in an edgewise direction and all the vertical loads are transmitted to the top of the spring leaves. The upper portion of each of the jaws is cored so that plate shims may be placed between the transom and the upper leaves of the spring assemblies, thereby raising or lowering the truck to suit operating conditions. The weight of the car is transmitted to the springs in substantial alignment with the spaced members 170, and the leaf springs are supported at the end by the rigid truck side frame and directly under the points of support of the weight of the car by the coil spring assemblies.

Only a relatively small portion of the load is reacted at the end of the spring assemblies, the greater amount being reacted or transmitted directly by the coil springs. For this reason the leaves of the plate spring assemblies are firmly pressed together, the result being that the spring leaves are held together by the load at a point outside the center spring band 182 or in a region where, during the deflection of the leaf springs, there is considerable sliding of one leaf in relation to the others, the friction between the plate spring leaves being the means by which the oscillating energy of the spring group is absorbed.

Figure 1:
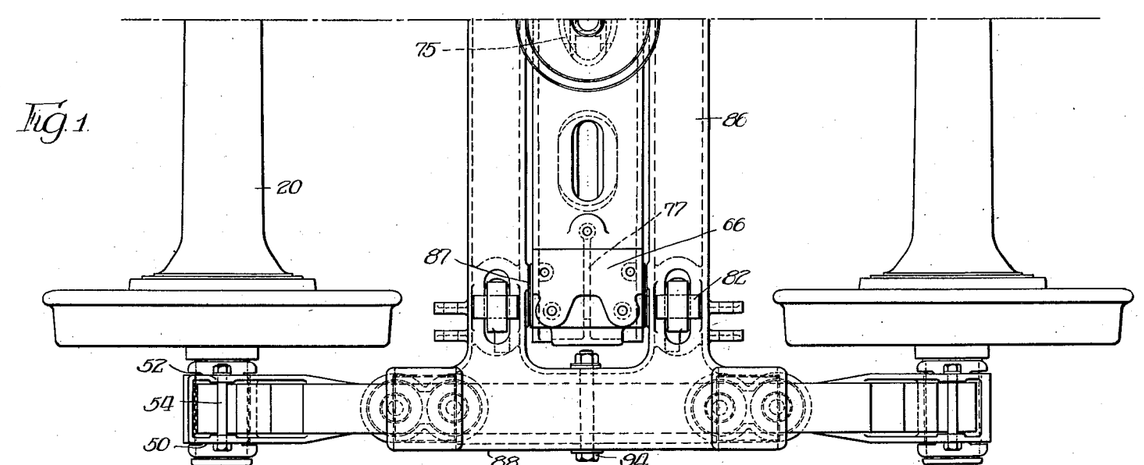
Figure 1 is a fragmentary top plan view of a truck assembly embodying the invention.
Figure 2:
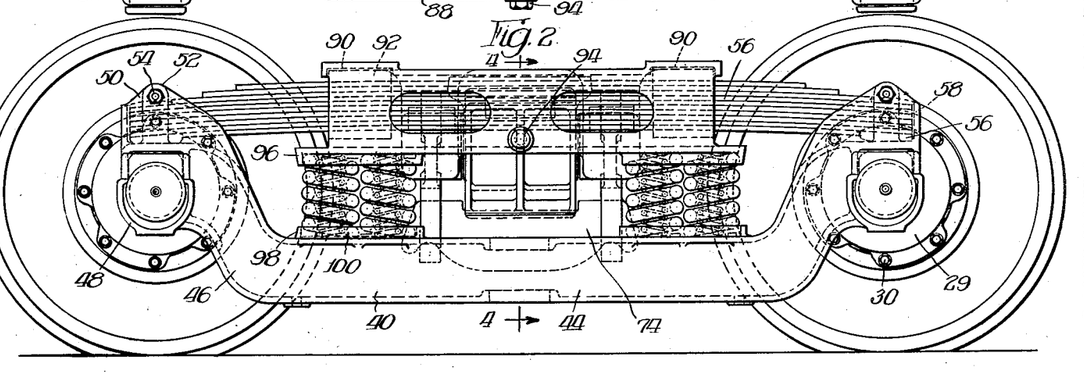
Figure 2 is a side elevation of the truck assembly shown in Figure 1.
Figure 8:
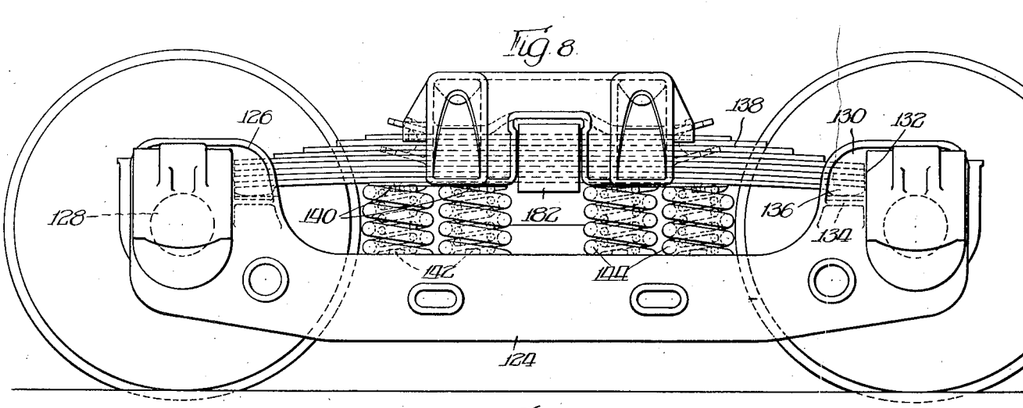
Figure 8 is a side elevation of the truck assembly shown in Figure 6.

It will be noted that the cooperating surfaces between the leaf springs and the spring seats in both the constructions shown in Figure 2 and Figure 8 are arranged so that one of the surfaces is arcuate or convexed whereby deflection of the leaf spring will shorten the effective support of the springs under load. That is, when a light load is applied to the springs the distance between the supporting points of the spring will be greater than when a heavy load is applied. This causes the load carrying capacity of the spring to be increased as the weight to be supported is increased.

Figure 9:
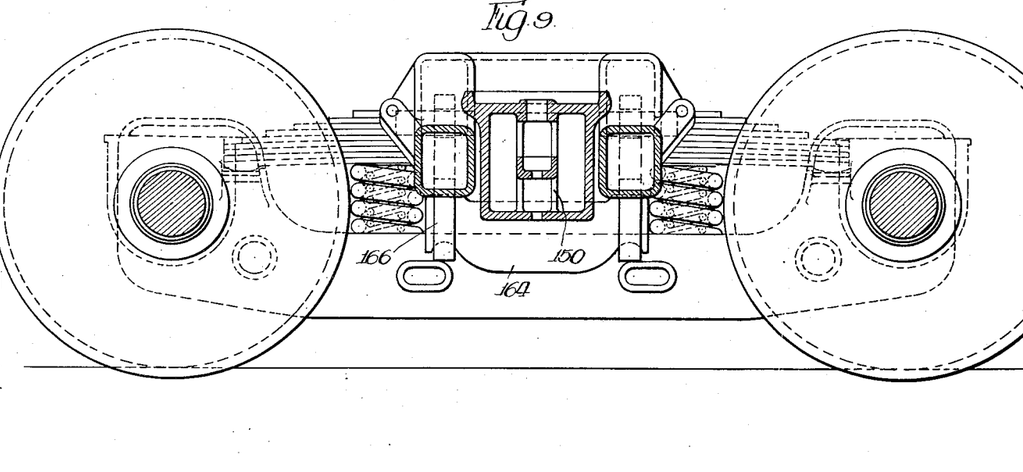
Figure 9 is a sectional side elevation taken substantially at the center line of the truck assembly shown in Figure 6.
Figure 10:
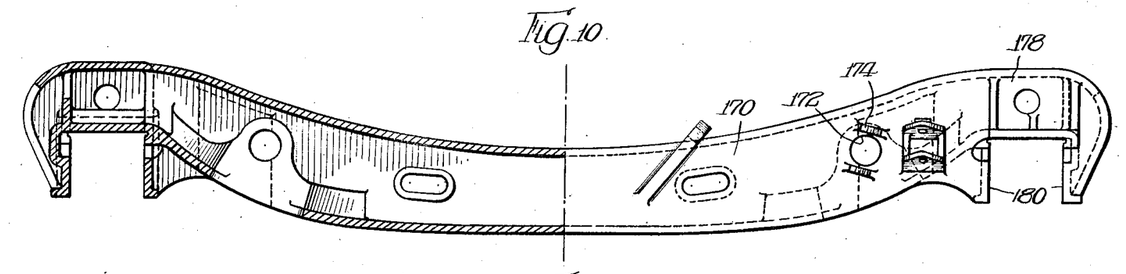
Figure 10 is a longitudinal partial sectional elevation through a portion of the main frame or transom adapted to be used with the assembly shown in Figures 6 to 9 inclusive.
Figure 11:
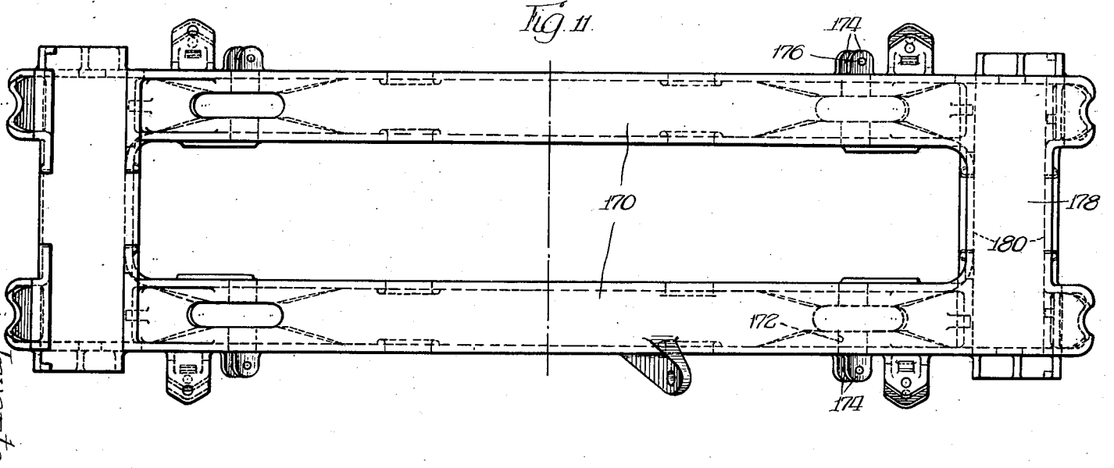
Figure 11 is a top plan view of the transom shown in Figure 10.

The load transferred from the transom to each spring assembly in the construction shown particularly in Figures 8 and 9 is carried at two distinct areas on the upper spring leaf, and the major portion of the load at each of these areas is supported directly on the side frame by means of the coil spring assemblies 144 interposed between the lower leaf of the leaf spring assembly and the spring seat provided on the side frame so that only a minor portion of the load is supported at the seats 134 by the stiffness of the leaf spring. With this arrangement each of the loads transferred at the upper leaf spring areas is directly employed to press the surfaces of the plates together, thus producing a maximum frictional absorption within the plate spring. With such an arrangement a resilient support is provided which inherently absorbs some of the energy of shocks by friction.

If coil springs alone are used practically all the energy of shocks is rebounded and a succession of light shocks often causes violent vertical oscillations detrimental to the car body and its lading. When a leaf spring alone is used the violent oscillations are prevented by friction between the spring leaves, but the comparatively large size and great weight of the leaf spring required to obtain resiliency equal to the coil spring is detrimental and undesirable.

With the present arrangement the high capacity of the coil spring is utilized for resiliently carrying the major portion of the load, and at the same time the desirable friction between the surfaces of the plate spring is utilized to absorb a portion of the shock, and thereby prevent oscillation.

This arrangement of the coil and leaf springs wherein the coil springs and the load are used to increase the frictional absorption of the leaf springs, and wherein the load is transferred in a parallel arrangement to the side frame and also from the load carrying member through the leaf springs to the coil springs, applicant will term a "series-parallel" arrangement.

It is to be understood that I do not wish to be limited by the exact embodiments of the device shown, which are merely by way of illustration and not limitation, as various and other forms of

I claim:

1. In a truck, the combination of a side frame, spaced wheel and axle assemblies associated therewith, a load carrying member, a resilient member between said load carrying member and said side frame, and means on said side frame cooperating with said resilient member to load said resilient member to thereby increase the amount of energy said resilient member will absorb.

2. In a truck, the combination of a side frame, spaced wheel and axle assemblies associated therewith, a load carrying member, a resilient member between said load carrying member and said side frame, and resilient means on said side frame cooperating with said resilient member to load said resilient member to thereby increase the amount of energy said resilient member will absorb.

3. In a truck, the combination of a side frame, spaced wheel and axle assemblies associated therewith, a load carrying member, a resilient member between said load carrying member and said side frame, and means engaging said resilient member and said side frame to load said resilient member to thereby increase the amount of energy said resilient member will absorb.

4. In a truck, the combination of a side frame, spaced wheel and axle assemblies associated therewith, a load carrying member, a resilient member between said load carrying member and said side frame, and resilient means engaging said resilient member and said side frame to load said resilient member to thereby increase the amount of energy said resilient member will absorb.

5. In a bolster, the combination of spaced upper and lower members, a main bearing integral with said upper member, a side bearing integral with said upper member, said lower member terminating in a hanger receiving seat, and a connecting web integral with said upper and lower members and disposed to merge into said side bearing and seat.

6. In a bolster, the combination of spaced upper and lower members, a main bearing integral with said upper member, a side bearing integral with said upper member, said lower member having a hanger receiving seat integral therewith and spaced therefrom, a reinforcing web integral with said lower member and said seat, and a connecting web integral with said upper and lower members and disposed substantially in the same plane with said first named web.

7. In a transom, the combination of spaced members, end connecting members integral therewith, and upwardly extending end portions terminating in downwardly extending jaws forming spaced seats for a common spring.

8. In a transom, the combination of a member having a slot disposed therein for receiving a hanger link, a pin seat formed on said member adjacent said slot for receiving a securing pin for said hanger link, and upstanding members on said member for embracing said pin to maintain the same in operative position.

9. In a truck, the combination of spaced wheel and axle assemblies, a side frame including a rigid member connecting said assemblies, said rigid member having a spring seat disposed adjacent each assembly, a spring assembly disposed between and seated on said seats, a transom seated on said spring assembly at spaced points, said transom including spaced members, a bolster located between said members and having an integral hanger seat, hanger means pivotally mounted on said transom and cooperating with said seat, and resilient means between said spring assembly and said rigid member.

10. In a truck, the combination of spaced wheel and axle assemblies, a side frame including a rigid member connecting said assemblies, said rigid member having a spring seat disposed adjacent each assembly, a spring assembly disposed between and seated on said seats, said spring assembly having securing means thereon, a transom having a spring cooperating portion embracing a portion of said spring assembly and seated thereon at spaced points, means in said transom cooperating with said securing means for positioning said spring assembly, said transom including spaced members, a bolster located between said members and having an integral hanger seat, hanger means pivotally mounted on said transom and cooperating with said seat, and resilient means between said spring and said rigid member.

11. In a truck, the combination of spaced wheel and axle assemblies, a side frame including a rigid member connecting said assemblies, said rigid member having a spring seat disposed adjacent each assembly, a spring assembly disposed between and seated on said seats, a transom seated on said spring assembly at spaced points, said transom including spaced members, a bolster located between said members and having an integral hanger seat, hanger means pivotally mounted on said transom and cooperating with said seat, and springs disposed between said rigid member and said spring assembly.

12. In a truck, the combination of spaced wheel and axle assemblies, a side frame including a rigid member connecting said assemblies, said rigid member having a spring seat disposed adjacent each assembly, a spring assembly disposed between and seated on said seats, a transom seated on said spring assembly at spaced points, said transom including spaced members, a bolster located between said members and having an integral hanger seat, hanger means pivotally mounted on said transom and cooperating with said seat, and springs disposed between said rigid member and said transom.

13. In a truck, the combination of spaced wheel and axle assemblies, a side frame including a rigid member connecting said assemblies, said rigid member having a spring seat disposed adjacent each assembly, a spring assembly disposed between and seated on said seats, said spring assembly having securing means thereon, a transom having a spring cooperating portion embracing a portion of said spring assembly and seated thereon at spaced points, means in said transom cooperating with said securing means for positioning said spring assembly, said transom including spaced members, a bolster located between said members and having an integral hanger seat, hanger means pivotally mounted on said transom and cooperating with said seat, and springs disposed between said rigid member and said spring assembly.

14. In a truck, the combination of spaced wheel and axle assemblies, a side frame including a rigid member connecting said assemblies, said rigid member having a spring seat disposed adjacent each assembly, a spring assembly disposed between and seated on said seats, said spring assembly having securing means thereon, a transom having a spring cooperating portion embracing a portion of said spring assembly and seated thereon at spaced points, means in said transom cooperating with said securing means for positioning said spring assembly, said transom including spaced members, a bolster located between said members and having an integral hanger seat, hanger means pivotally mounted on said transom and cooperating with said seat, and springs disposed between said rigid member and said transom.

15. In a truck, the combination of spaced wheel and axle assemblies, a side frame including a rigid member connecting said assemblies, said rigid member having a spring seat disposed adjacent each assembly, a spring assembly disposed between and seated on said seats, a transom seated on said spring assembly at spaced points, said transom including spaced members, a bolster located between said members and having an integral hanger seat, hanger means pivotally mounted on said transom and cooperating with said seat, and springs disposed between said rigid member and spring seats disposed on said spring assemblies.

16. In a truck, the combination of a bolster, a side frame, a frame member interposed between said bolster and side frame and having cooperative relation with said bolster, and spring members of different character and disposition interposed between said frame member and side frame for accommodating vertical and horizontal loads imposed on said bolster.

17. In a truck, the combination of a bolster, a side frame, a frame member interposed between said bolster and side frame and having cooperative relation with said bolster, and spring members of different character and disposition interposed between said frame member and side frame, said spring members being of the leaf and coil type whereby transverse forces and a portion of the vertical load imposed on said bolster are carried by said leaf springs and the balance of the vertical load is carried by said coil springs.

18. A car truck comprising spaced wheel and axle assemblies, side frames connecting said assemblies, each of said frames including a rigid member and a substantially flat flexible member substantially rigidly supported thereby, resilient means disposed between said members and intermediate the supports thereof on said rigid member, a transom between said flexible members, and a bolster supported by said transom.

19. A car truck comprising spaced wheel and axle assemblies, side frames connecting said assemblies, each of said frames including a rigid member and a substantially flat flexible member substantially rigidly supported thereby, resilient means disposed between said members and intermediate the supports thereof on said rigid member, a transom between said flexible members, said transom including spaced members, and a bolster supported by said transom and between said spaced members.

20. A car truck comprising spaced wheel and axle assemblies, side frames connecting said assemblies, each of said frames including a rigid member and a substantially flat flexible member substantially rigidly supported thereby, resilient means disposed between said members and intermediate the supports thereof on said rigid member, a transom between said flexible members, said transom including spaced members, and a bolster hung from said transom and between said spaced members.

21. A car truck comprising spaced wheel and axle assemblies, side frames connecting said assemblies, each of said frames including a rigid member and resilient members of different character, a transverse frame member partially supported by each of said different resilient members, and a bolster having cooperative relation with said transverse frame member, one of said resilient members transmitting end thrusts to the adjacent side frame.

22. A car truck comprising spaced wheel and axle assemblies, side frames connecting said assemblies, each of said frames including a rigid member and resilient members of different character, a transverse frame member having cooperative seating engagement with each of said different resilient members, and a bolster having cooperative relation with said transverse frame member, one of said resilient members transmitting end thrusts to the adjacent side frame.

23. A car truck comprising spaced wheel and axle assemblies, side frames connecting said assemblies, each of said frames including a rigid member and resilient members of different character, each of said different resilient members seating with said rigid member and having cooperative seating engagement one with the other, a transverse frame member having cooperative seating engagement with one of said different resilient members, and a bolster having cooperative relation with said transverse frame member, one of said resilient members transmitting end thrusts to the adjacent side frame.

24. A spring load supporting construction comprising a leaf spring supported at its ends, including a plurality of superimposed cooperating spring leaves, portions of which are disposed as a supporting column between a supporting coil spring and the load, said coil spring engaging said spring leaves, the load being applied to said spring leaves in alignment with said coil spring and intermediate the center and an end of certain of said spring leaves.

25. A spring load supporting construction comprising a leaf spring supported at its ends, including a plurality of superimposed cooperating spring leaves, portions of which are disposed as a supporting column between a supporting coil spring and the load at a location wherein relative movement will occur between said leaves during flexure.

26. In a truck, the combination of spaced wheel and axle assemblies, a member disposed between and connecting said wheel and axle assemblies, a load carrying member, and resilient means of different character disposed substantially coplanar with said first-named member supporting said load carrying member on said first named member, said resilient means being arranged so that certain of said means is adapted to increase the energy absorption under load of certain of the other means.

27. In a bolster, the combination of spaced tension and compression members, said compression member having center and side bearings, an end brace member connecting said tension and compression members, said tension member and said brace member merging into a hanger receiving seat.

28. In a bolster, the combination of spaced tension and compression members, said compression member having center and side bearings, an end brace member extending in a direction longitudinally of said bolster and connecting said tension and compression members, said tension member and said brace member merging into a hanger receiving seat.

29. In a car truck, the combination of wheel and axle assemblies, a depressed rigid beam member connecting said wheel and axle assemblies, said beam member having seats disposed adjacent said wheel and axle assemblies, a flexible member seated on said seats, a load carrying member carried by said flexible member and seated thereon at a plurality of points, the contact between said flexible member and said seats being disposed to change the effective length of said flexible member when said load carrying member is loaded.

30. In a car truck, the combination of wheel and axle assemblies, a depressed rigid beam member connecting said wheel and axle assemblies, said beam member having seats disposed adjacent said wheel and axle assemblies, a flexible member seated on said seats, a load carrying member carried by said flexible member and seated thereon at a plurality of points, the contact between said flexible member and said seats being disposed to diminish the effective length of said flexible member when said load carrying member is loaded.

31. In a car truck, the combination of wheel and axle assemblies, a depressed rigid beam member connecting said wheel and axle assemblies, said beam member having seats disposed adjacent said wheel and axle assemblies, a flexible member seated on said seats, a load carrying member carried by said flexible member, the contact between said flexible member and said seats being disposed to change the effective length of said flexible member when said load carrying member is loaded, and resilient means disposed between said beam member and said flexible member to increase the frictional absorption of said flexible member under said condition of load.

32. In a car truck, the combination of wheel and axle assemblies, a depressed rigid beam member connecting said wheel and axle assemblies, said beam member having seats disposed adjacent said wheel and axle assemblies, a flexible member seated on said seats, a load carrying member carried by said flexible member, the contact between said flexible member and said seats being disposed to diminish the effective length of said flexible member when said load carrying member is loaded, and resilient means disposed between said beam member and said flexible member to increase the frictional absorption of said flexible member under said condition of load.

33. In a car truck, the combination of wheel and axle assemblies, a side frame member connecting said wheel and axle assemblies, said side frame member having seats disposed adjacent said wheel and axle assemblies, a flexible member seated on said seats, a load carrying member carried by said flexible member and seated thereon at a plurality of points, the contact between said flexible member and said seats being disposed to change the effective length of said flexible member when said load carrying member is loaded.

34. In a car truck, the combination of wheel and axle assemblies, a side frame member connecting said wheel and axle assemblies, said side frame member having seats disposed adjacent said wheel and axle assemblies, a flexible member seated on said seats, a load carrying member carried by said flexible member and seated thereon at a plurality of points, the contact between said flexible member and said seats being disposed to diminish the effective length of said flexible member when said load carrying member is loaded.

35. In a car truck, the combination of wheel and axle assemblies, a side frame member connecting said wheel and axle assemblies, said side frame member having seats disposed adjacent said wheel and axle assemblies, a flexible member seated on said seats, a load carrying member carried by said flexible member, the contact between said flexible member and said seats being disposed to change the effective length of said flexible member when said load carrying member is loaded, and resilient means disposed between said side frame member and said flexible member to increase the frictional absorption of said flexible member under said condition of load.

36. In a car truck, the combination of wheel and axle assemblies, a side frame member connecting said wheel and axle assemblies, said side frame member having seats disposed adjacent said wheel and axle assemblies, a flexible member seated on said seats, a load carrying member carried by said flexible member, the contact between said flexible member and said seats being disposed to diminish the effective length of said flexible member when said load carrying member is loaded, and resilient means disposed between said side frame member and said flexible member to increase the frictional absorption of said flexible member under said condition of load.

37. In a truck the combination of a side frame, an upper flexible load-carrying member cooperating at its ends with a lower rigid member whereby the effective length of said flexible member decreases as the load increases, said flexible load carrying member cooperating with resilient members at intermediate spaced points to increase the frictional energy absorption of said flexible member.

38. In a truck, the combination of a side frame, a load carrying member, a leaf spring interposed between said side frame and load carrying member, and a spring band cooperating with said spring and load carrying member, said leaf spring being loaded at points outside of said spring band.

39. In a truck, the combination of a side frame, a load carrying member, a leaf spring interposed between said side frame and load carrying member, a spring band cooperating with said spring and load carrying member, said leaf spring being loaded at points outside of said spring band, and resilient means interposed between said load carrying member and frame for absorbing part of the forces due to load imparted to said load carrying member.

40. In a truck, the combination of a side frame, a load carrying member, a leaf spring interposed between said side frame and load carrying member, a spring band cooperating with said spring and load carrying member, said leaf spring being loaded at points outside of said spring band, and resilient means of a character different from said leaf spring interposed between said load carrying member and frame for absorbing part of the forces due to load imparted to said load carrying member.

41. In a truck, the combination of a side frame, a load carrying member, a leaf spring interposed between said side frame and load carrying member, a spring band cooperating with said spring and load carrying member, said leaf spring being loaded at points outside of said spring band, and a coil spring interposed between said load carrying member and frame for absorbing part of the forces due to load imparted to said load carrying member.

42. In a truck, the combination of a side frame, a load carrying member, having a leaf spring interposed between said side frame and said member, a spring band cooperating with said spring and load carrying member, said leaf spring being loaded at points outside of said spring band, and resilient means interposed between said leaf spring and frame for absorbing forces due to load imparted to said load carrying member.

43. In a truck, the combination of a side frame, a load carrying member, a leaf spring interposed between said side frame and said member, a spring band cooperating with said spring and load carrying member, said leaf spring being loaded at points outside of the spring band, and resilient means of a character different from said leaf spring interposed between said leaf spring and frame for absorbing forces due to load imparted to said load carrying member.

44. In a truck, the combination of a side frame, a load carrying member, a leaf spring interposed between said side frame and said member, a spring band cooperating with said spring and load carrying member, said leaf spring being loaded at points outside of the spring band, and a coil spring interposed between said leaf spring and frame for absorbing forces due to load imparted to said load carrying member.

45. In a truck, the combination of a side frame, spaced wheel and axle assemblies associated therewith, a bolster, a resilient member between said bolster and said side frame, and means on said side frame of a different character than said resilient member and cooperating with said resilient member to load said resilient member to thereby increase the amount of energy said resilient member will absorb.

46. In a truck, the combination of a side frame, spaced wheel and axle assemblies associated therewith, a bolster, a resilient member between said bolster and said side frame, and resilient means on said side frame of a different character than said resilient member and cooperating with said resilient member to load said resilient member to thereby increase the amount of energy said resilient member will absorb.

47. In a truck, the combination of a side frame, spaced wheel and axle assemblies associated therewith, a bolster, a resilient member between said bolster and said side frame, and means directly cooperating with said resilient member and said side frame to load said resilient member to thereby increase the amount of energy said resilient member will absorb.

48. In a truck, the combination of a side frame, spaced wheel and axle assemblies associated therewith, a bolster, a resilient member between said bolster and said side frame, and resilient means directly cooperating with said resilient member and said side frame to load said resilient member to thereby increase the amount of energy said resilient member will absorb.

49. In a truck, the combination of spaced wheel and axle assemblies, members disposed between and cooperating with said assemblies, said members including a flexible member having a flexing portion, a rigid member and a bolster, and resilient means disposed between and constantly engaging said rigid member and said flexing portion and intermediate the ends thereof.

50. In a truck, the combination of spaced wheel and axle assemblies, members disposed between and cooperating with said assemblies, said members including a substantially flat upper flexible and a lower rigid member, a bolster supported on said flexible member, and resilient means disposed between said flexible and rigid members and intermediate the ends thereof.

51. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and coil spring means interposed between said side frame and said leaf spring whereby the load is supported to substantially a greater extent by said coil spring means.

52. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and resilient means interposed between said side frame and said leaf spring whereby the load is supported to substantially a greater extent by said resilient means.

53. In a truck, the combination of a side frame provided with journal boxes having cooperative engagement with wheel and axle assemblies, a bolster, spring seats adjacent said journal boxes, a longitudinally disposed leaf spring supporting said bolster, said spring being supported by said spring seats, and coil spring means interposed between said side frame and bolster whereby the load is supported to substantially a greater extent by said coil spring means.

54. In a car truck, the combination of a side frame having journal boxes cooperating with wheel and axle assemblies, a load carrying member, seat members fixed with respect to said side frame adjacent said journal boxes, friction means including a substantially flat spring engaging said seats and supporting said load carrying member, and resilient means interposed between said load carrying member and side frame and disposed between the center and ends of said spring.

55. In a car truck, the combination of a side frame having journal boxes cooperating with wheel and axle assemblies, a load carrying member, fixed seat members on said side frame adjacent said journal boxes, friction means including a substantially flat spring engaging said seats and supporting said load carrying member, and resilient means of different character than said friction means interposed between said spring and side frame and disposed between the center and ends of said spring.

56. In a car truck, the combination of a side frame having journal boxes cooperating with wheel and axle assemblies, a bolster, fixed seat members on said side frame adjacent said journal boxes, friction means including a substantially flat spring engaging said seats and supporting said bolster, and resilient means of different character than said friction means interposed between said bolster and side frame and disposed between the center and ends of said spring.

57. In a car truck, the combination of a side frame having journal boxes cooperating with wheel and axle assemblies, a load carrying member, fixed seat members adjacent said journal boxes, friction means engaging said seats and supporting said load carrying member, and resilient means of different character than said friction means interposed in series-parallel with said friction means between said load carrying member and side frame.

58. In a car truck, the combination of a side frame having journal boxes cooperating with wheel and axle assemblies, a load carrying member, fixed seat members adjacent said journal boxes, friction means engaging said seats and supporting said load carrying member, and resilient means of different character than said friction means interposed in series-parallel with said friction means between said friction means and side frame.

59. In a car truck, a side frame, a bolster, and differential resilient means between said bolster and said side frame, the parts of said differential means being of different character and cooperating with each other to increase the amount of frictional energy absorption of said means, said differential means being disposed substantially in the plane of said side frame.

60. In a car truck, a side frame, a bolster, a resilient member carried on said side frame at spaced points and supporting said bolster through intermediate spaced points, and resilient means cooperating with said resilient member to increase its energy absorption.

61. In a car truck, a side frame, a bolster, a resilient member carried on said side frame and disposed longitudinally thereof and supporting said bolster, and resilient means cooperating with said resilient member to increase its energy absorption.

62. In a car truck, a side frame, a bolster, a resilient member carried on said side frame at spaced points and supporting said bolster at intermediate spaced points, and resilient means cooperating with said resilient member and said side frame to increase its energy absorption.

63. In a car truck, a side frame, a bolster, a leaf spring supported by said side frame at spaced points and supporting said bolster at spaced points, and coil springs cooperating with said side frame and said bolster intermediate said first named spaced points and the center of said leaf spring to increase the energy absorption.

64. In a car truck, a side frame having axle mountings, a leaf spring supported on spaced supports on said side frame adjacent said axle mountings, resilient means supporting said leaf spring on said side frame intermediate said spaced supports and the center of said leaf spring, and a bolster supported on said leaf spring.

65. In a car truck, a side frame having axle mountings, a leaf spring supported on spaced supports on said side frame adjacent said axle mountings, resilient means supporting said leaf spring on said side frame intermediate said spaced supports and the center of said leaf spring, and a bolster supported by said leaf spring and resilient means.

66. In a car truck, a side frame having axle mountings, a leaf spring supported on spaced supports on said side frame adjacent said axle mountings, resilient means supporting said leaf spring on said side frame intermediate said spaced supports, and a bolster supported by said leaf spring and resilient means, the major portion of the load being supported by said resilient means.

67. In a truck, the combination of a side frame, spaced wheel and axle assemblies associated therewith, a bolster, a resilient member between said bolster and said side frame, and means on said side frame of a different character than said resilient member and cooperating with said resilient member to load said resilient member to thereby increase the amount of energy said resilient member will absorb.

68. In a car truck, the combination of a side frame having journal boxes cooperating with wheel and axle assemblies, a load carrying member, seat members on said side frame adjacent said journal boxes, friction means supporting said load carrying member on said seats, and resilient means interposed between said friction means and side frame, said friction means and said resilient means being directly supported on said side frame.

69. In a car truck, the combination of a side frame having journal boxes cooperating with wheel and axle assemblies, a load carrying member, fixed seat members adjacent said journal boxes, friction means supporting said load carrying member on said seats, and resilient means of different character than said friction means interposed between said friction means and side frame, said friction and resilient means being disposed in series-parallel.

70. In a car truck, the combination of a side frame having journal boxes cooperating with wheel and axle assemblies, a load carrying member, seat members on said side frame adjacent said journal boxes, friction means supporting said load carrying member on said seats, and resilient means interposed between said load carrying member and side frame and disposed in series-parallel with said friction means.

71. In a car truck, a side frame, a bolster, and differential resilient means between said bolster and said side frame, the parts of said differential means being of different character and cooperating with each other to increase the amount of frictional energy absorption thereof, said differential means being disposed longitudinally of said truck.

72. In a car truck, the combination of a side frame having journal boxes cooperating with wheel and axle assemblies, a load carrying member, seat members adjacent said journal boxes, friction means supporting said load carrying member on said seats, and resilient means of different character than said friction means interposed between said load carrying member and side frame and intermediate the center and ends of said friction means.

73. In a car truck, the combination of a side frame having journal boxes cooperating with wheel and axle assemblies, a load carrying member, seat members adjacent said journal boxes, friction means supporting said load carrying member on said seats, and resilient means of different character than said friction means interposed between said load carrying member and side frame and intermediate the center and points of support of said friction means.

74. In a car truck, the combination of a side frame having journal boxes cooperating with wheel and axle assemblies, a load carrying member, seat members adjacent said journal boxes, friction means supporting said load carrying member on said seats, and resilient means of different character than said friction means interposed between said load carrying member and side frame and intermediate said seats and the center of said friction means.

75. In a car truck, the combination of a supporting member, a supported member, means for supporting said second named member on said first named member, said means including a group of coil and leaf springs disposed longitudinally of said truck and cooperating substantially in proportion to the load to vary the energy absorption of the leaf springs.

76. In a car truck, the combination of a supporting member, a supported member, means for supporting said second named member on said first named member, said means including a leaf spring disposed longitudinally of said truck and cooperating to compress a coil spring whereby under load the leaf spring has increased energy absorption.

77. In a car truck, the combination of a supporting member, a supported member, means for supporting said second named member on said first named member, said means including a leaf spring disposed longitudinally of said truck and cooperating to load a resilient member whereby the leaf spring has varied energy absorption.

78. In a car truck, the combination of a supporting member, a supported member, means for supporting said second named member on said first named member, said means including a load-carrying assembly of interload transmitting coil and leaf springs disposed longitudinally of said truck and cooperating to increase the energy absorbing capacity of the leaf springs.

79. In a car truck, the combination of a supporting member, a supported member, means for supporting said second named member on said first named member, said means including a load-carrying assembly of coil and leaf springs disposed longitudinally of said truck and cooperating to increase the energy absorbing capacity of the leaf springs as the load is increased.

80. In a car truck, the combination of a supporting member, a supported member, means for supporting said second named member on said first named member, said means including a group of coil and semi-elliptic springs disposed longitudinally of said truck and cooperating substantially in proportion to the load to vary the energy absorption of the semi-elliptic springs.

81. In a car truck, the combination of a supporting member, a supported member, means for supporting said second named member on said first named member, said means including a semi-elliptic spring disposed longitudinally of said truck and cooperating to compress a coil spring whereby under load the semi-elliptic spring has increased energy absorption.

82. In a car truck, the combination of a supporting member, a supported member, means for supporting said second named member on said first named member, said means including a semi-elliptic spring disposed longitudinally of said truck and cooperating to load a resilient member whereby the semi-elliptic spring has varied energy absorption.

83. In a car truck, the combination of a supporting member, a supported member, means for supporting said second named member on said first named member, said means including a load-carrying assembly of interload transmitting coil and semi-elliptic springs disposed longitudinally of said truck and cooperating to increase the energy absorbing capacity of the semi-elliptic springs.

84. In a car truck, the combination of a supporting member, a supported member, means for supporting said second named member on said first named member, said means including a load-carrying assembly of coil and semi-elliptic springs disposed longitudinally of said truck and cooperating to increase the energy absorbing capacity of the semi-elliptic springs as the load is increased.

85. In a car truck, the combination of a supporting member, a supported member, means for supporting said second named member on said first named member, said means including a load-carrying leaf spring disposed longitudinally of said truck and cooperating with a resilient member whereby the energy absorption of the leaf spring increases as the load increases.

86. In a car truck, the combination of a supporting member, a supported member, means for supporting said second named member on said first named member, said means including a load supporting leaf spring disposed longitudinally of said truck and cooperating with another supporting member to squeeze together the leaves of the leaf spring.

87. In a car truck, the combination of a supporting member, a supported member, means for supporting said second named member on said first named member, said means including a load supporting leaf spring disposed longitudinally of said truck and cooperating with a resilient member to squeeze together the leaves of the leaf spring with a force which varies substantially with the load.

88. In a car truck, the combination of a supporting member, a supported member, means for supporting said second named member on said first named member, said means including a load supporting leaf spring disposed longitudinally of said truck and cooperating with a resilient member to squeeze together the leaves of the leaf spring with a force which increases as the load increases.

89. In a truck, the combination of a side frame member consisting of a beam having axle cooperating members, said beam having a portion depressed below the axle cooperating members, a spring seating on said depressed portion, a leaf spring disposed substantially above and in substantially alignment with said members, and a load carrying member resiliently supported by said springs.

90. A car truck comprising spaced wheel and axle assemblies, side frames connecting said assemblies, each of said frames including a rigid member and a substantially flat flexible member supported thereby adjacent its ends, resilient means disposed between said members intermediate the ends of said flexible member, a transom between said flexible members and seated on each of said members through a plurality of seats, said transom including spaced members, and a bolster supported by said transom and between said spaced members.

91. A car truck comprising spaced wheel and axle assemblies, side frames connecting said assemblies, each of said frames including a rigid member and a substantially flat flexible member supported thereby adjacent its ends, resilient means disposed between said members intermediate the ends of said flexible member, a transom between said flexible members and seated on each of said members through a plurality of seats, said transom including spaced members, and a bolster.

92. A car truck comprising spaced wheel and axle assemblies, side frames connecting said assemblies, each of said frames including a rigid member and a substantially flat flexible member supported thereby adjacent its ends, resilient means disposed between said members intermediate the ends of said flexible member, a transom between said flexible members and seated on each of said members through a plurality of seats, said transom including spaced members, and a bolster supported by said transom and between said spaced members.

93. A car truck comprising spaced wheel and axle assemblies, side frames connecting said assemblies, each of said frames including a rigid member and a substantially flat flexible member supported thereby adjacent its ends, resilient means disposed between said members intermediate the ends of said flexible member, a transom between said flexible members and seated on each of said members through a plurality of seats, said transom including spaced members, and a bolster.

94. A single bar side frame including an elongated body portion having spring seats thereon, end portions extending upwardly from said body portion and being provided with journal means, and a spring seat on each of said end portions adapted to accommodate a spring, said last named seat having walls for accommodating end and side thrusts from a spring seated on said last named seats.

95. A car truck comprising a rigid member, a flexible member disposed between and seated on portions of said rigid member and adapted to impart stresses in a plurality of directions thereto, and resilient means of different character than said flexible member disposed between said members and spaced from the transverse center line of said flexible member.

96. A car truck comprising a rigid member having upwardly extending end portions, a flexible member spanning between and seated on said end portions and adapted to impart stresses in a plurality of directions thereto, and resilient means of different character than said flexible member disposed between said members and spaced from the transverse center line of said flexible member.

97. In a car truck, the combination of a side frame provided with journal boxes, a load carrying member having a recessed end portion, a semi-elliptic leaf spring supported on spaced seats fixed on said side frame and having a portion received in said recessed portion, and resilient means disposed on said side frame adjacent said spring and engaging said load carrying member.

ALFRED H. OELKERS.